United States Patent [19]

Jamison

[11] 4,298,212
[45] Nov. 3, 1981

[54] HITCH PIN

[76] Inventor: Merle A. Jamison, Rte. 2, Box 211, Salem, Va. 24153

[21] Appl. No.: 98,375

[22] Filed: Nov. 27, 1979

[51] Int. Cl.³ .............................................. B60D 1/02
[52] U.S. Cl. .................................... 280/515; 280/506
[58] Field of Search ......................... 280/515, 514, 506

[56] References Cited

U.S. PATENT DOCUMENTS 1,887,054 11/1932 Wood .................................. 280/515
2,441,430 5/1948 McCullar ........................... 280/515
4,099,739 7/1978 Foley ................................. 280/515

Primary Examiner—John P. Silverstrim
Attorney, Agent, or Firm—Harvey B. Jacobson

[57] ABSTRACT

A draft vehicle including a first rearwardly projecting supportive tow bar having a first upstanding opening therethrough is provided and a towed apparatus including a second forwardly projecting tow bar horizontally lapped over and supported from the first tow bar is also provided. A second opening is formed through the second tow bar and registered with the first opening and an upstanding hitch pin is passed through the openings coupling the first and second tow bars together. The hitch pin includes an upper end portion projecting above the second tow bar and abutment structure is mounted on the upper end portion of the pin for vertical shifting relative thereto above a lower limit position on the pin. Further, strong spring structure is operatively connected between the abutment structure and the pin for yieldingly biasing the abutment structure downwardly along the pin toward its lower limit position thereon.

10 Claims, 4 Drawing Figures

HITCH PIN

BACKGROUND OF THE INVENTION

Farm tractors and the like are conventionally provided with rearwardly projecting tow bars and many implements, such as a pull-type BUSH-HOG are pulled behind conventional draft vehicles. These implements are conventionally provided with forwardly projecting tow bar assemblies including upper and lower tow bar portions having vertically registered openings formed therethrough and these tow bar portions are releasably connectible to an associated rearwardly projecting tow bar disposed between the upper and lower tow bar portions by a conventional hitch pin passed through the openings in the upper and lower tow bar portions as well as the associated rearwardly projecting tow bar.

However, these conventional pins include headed upper ends and rest by gravity with their upper end heads supported from the upper surfaces of the associated upper tow bar portions. If the draft vehicle and implement being towed therebehind through the utilization of such a conventional headed pin is moved over uneven terrain causing relative roll and pitch movements between the draft vehicle and the towed implement, considerable axial forces may be applied to the pin in a manner tending to strip the head of the pin from the upper end thereof. Although conventional pins of the above-referred to type function adequately while moving over even ground, when the draft vehicle and implement being towed therebehind are subject to relative roll and pitch movement, even the strongest pins being manufactured are unable to withstand continued usage without the heads of the pins being stripped therefrom or the pins incurring excessive wear beneath the head thereof or to the undersides of the heads and the opposing hitch upper surfaces. It is well-known that conventional hitch pins have such a short operating life and they are frequently displayed in many equipment stores as convenience items, in that they are prominently displayed as a reminder to any prospective purchaser that hitch pins are available in that particular equipment store.

Accordingly, a need exists for an improved form of implement hitch pin.

Examples of hitch pins including some of the general structural and operational features of the instant invention are disclosed in U.S. Pat. Nos. 1,887,054, 2,482,907, 3,190,677, 3,794,357 and 4,087,112.

BRIEF DESCRIPTION OF THE INVENTION

The hitch pin of the instant invention includes an upper end portion along which an abutment supported by the pin is shiftable above a lower limit position on the pin and spring structure is operatively connected between the pin and the abutment structure yieldingly biasing the latter downwardly along the upper pin portion toward its lower limit position of movement on the pin.

The main object of this invention is to provide an improved hitch pin which will enjoy and an extended life of operation even when utilized to couple a towed implement behind a draft vehicle when relative roll and pitch movements are experienced between the draft vehicle and implement.

Another object of this invention is to provide an improved hitch pin constructed in a manner whereby it may comprise a convenient substitution for substantially all conventional hitch pins.

Still another important object of this invention is to provide an improved hitch pin which may be readily installed and removed in the conventional manner.

A final object of this invention to be specifically enumerated herein is to provide an improved hitch pin in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
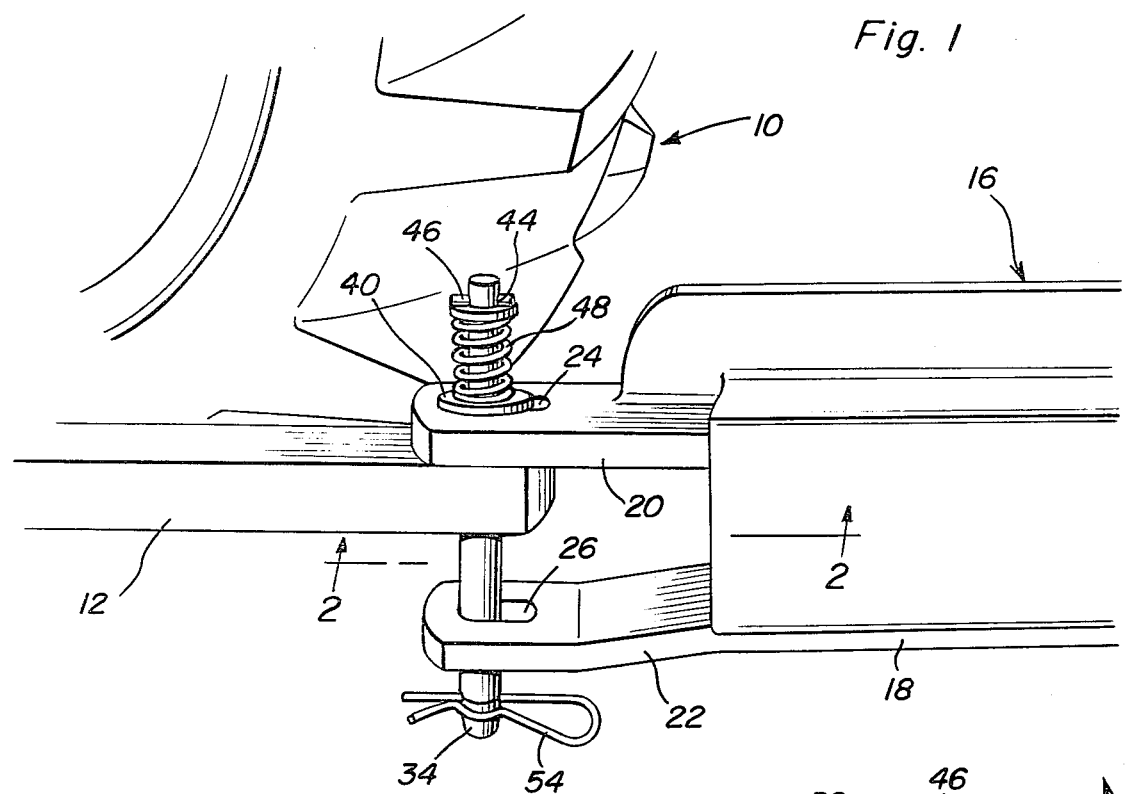
FIG. 1 is a fragmentary, perspective view illustrating the improved hitch pin of the instant invention in operative association with and removably coupling a implement to the rearwardly projecting tow bar portion of a tractor.

Referring now more specifically to the drawings, the numeral 10 generally designates a conventional form of farm tractor including a rearwardly projecting tow bar portion 12 having an upstanding opening 14 formed therethrough. Further, the reference numeral 16 generally designates an implement such as a model #109-0 BUSH-HOG equipped with a forwardly projecting tow hitch 18 including forwardly projecting upper and lower tow bar portions 20 and 22 between which the rear end of the tow bar portion 12 is received. The tow bar portions 20 and 22 include vertical slots 24 and 26 formed therethrough as is conventional and it will be noted that the tow bar portion 20 horizontally overlaps and is supported from the tow bar portion 12.

The hitch pin of the instant invention is referred to in general by the reference numeral 30 and includes an upstanding pin member 32 including a lower tapered end 34 having a diametric bore 36 formed therethrough. The pin member extends vertically through the opening 14 and the slots 26 with the lower tapered end 34 spaced below the tow bar portion 22 and the pin member 32 includes a diametrically reduced upper end portion 38 upon which a washer-like abutment 40 is slidably mounted, an upwardly facing circumferential shoulder 42 being defined at the lower extremity of the diametrically reduced upper end portion 38. The washer 40 is slidable on the upper end portion 38 above the shoulder 42 and the latter defines a lower limit position of movement of the washer 40 along the upper end portion 38.

The upper end of the upper end portion 38 includes a diametric bore 44 through which a retaining pin 46 is secured and a coiled compression spring 48 is disposed about the upper end portion 38 above the abutment washer 40 and below a retaining washer 50 disposed on the upper end portion 38 immediately below the pin 46.

The compression spring 48 comprises a strong compression spring. The compression spring 48 exerts a downward force of approximately 100 pounds on the abutment washer 40 when the latter is seated against the shoulder 42 and the thrust of the spring on the washer 40 increases by approximately 100 pounds per ⅛ inch deflection of the spring 48.

Figure 3:
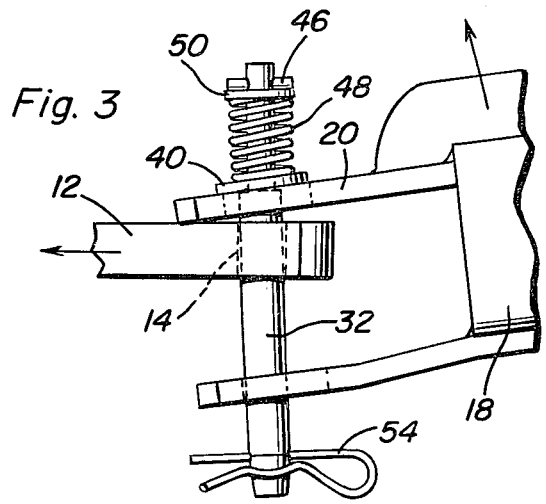
FIG. 3 is a fragmentary side elevational view illustrating the manner of operation of the hitch pin to relieve axial pressures thereon when the tractor tow bar and implement hitch experience relative pitch movements.

With attention now invited more specifically to FIG. 3 of the drawings, it may be seen that when the tow bar portion 12 and tow hitch 18 experience relative pitch movement, the pin member 32 is cocked in the opening 14 so as to be tightly gripped therein and the upper tow bar portion 20 cams the abutment washer 40 upwardly against the downwardly biasing action of the spring 48. In addition, with attention invited more specifically FIG. 4, when the tow bar portion 12 and tow hitch 18 experience relative pitch and roll movements, the pin member 32 is even more tightly gripped in the opening 14 and the tow bar portion 20 upwardly displaces the washer 40 from its lower limit position illustrated in FIG. 2.

Figure 4:
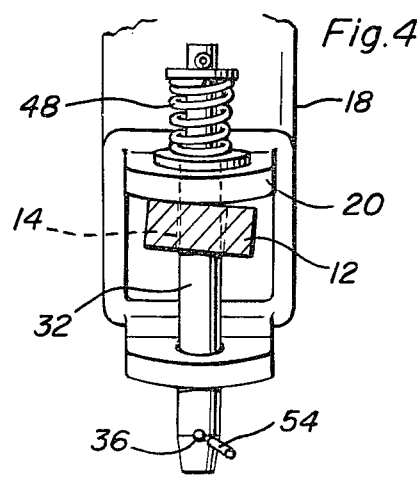
FIG. 4 is a transverse vertical sectional view of the assemblage illustrated in FIG. 3 and illustrating the manner in which the hitch pin functions to relieve axial pressures thereon when the associated tractor tow bar and implement hitch experience relative roll and pitch movements.

If the pin 30 comprised a conventional pin including only an abutment, such as a head fixedly secured to the pin member 32 in the location of the abutment washer 40, the upward camming action of the tow bar portion 20 on such an abutment in the manner illustrated in FIGS. 3 and 4 of the drawings would exert more than 5,000 pounds axial thrust on the abutment attempting to strip it from the upper end of the conventional hitch pin.

Actual tests have been conducted utilizing an Inerpac RCH 121 HOLL-O-CYLINDER. The test results indicate that the upward camming pressure on a hitch pin head in the environment illustrated in FIG. 4 may be as high as 5,245 pounds.

However, by mountain the abutment washer 40 on the upper end portion 38 for vertical movement therealong above the shoulder 42 and utilizing a strong compression spring 48 to downwardly bias the washer 40 to its lower limit position of movement, it may be seen from FIGS. 3 and 4 of the drawings that the only camming action exerted on the pin 32 by the tow bar portion 20 comprises that amount required to deflect the spring 48 to the positions thereof illustrated in FIGS. 3 and 4, approximately 300 to 400 pounds, which amount is readily sustained by the washer 50 and the pin 46. Thus, it may be seen that the hitch pin 30 is capable of operating in an improved manner over conventional hitch pins.

The BUSH-HOG above referred to comprises an offset implement and is used primarily in orchards enabling mowing and ground clearing operations to be carried about the base of fruit trees. When mowing and ground clearing operations are performed with such an implement in an orchard the implement and draft vehicle (farm tractor) experience considerable relative roll and pitch movements. Therefore, the hitch pin of the instant invention offers considerable operational advantages over conventional hitch pins in the fruit growing industry.

Figure 2:
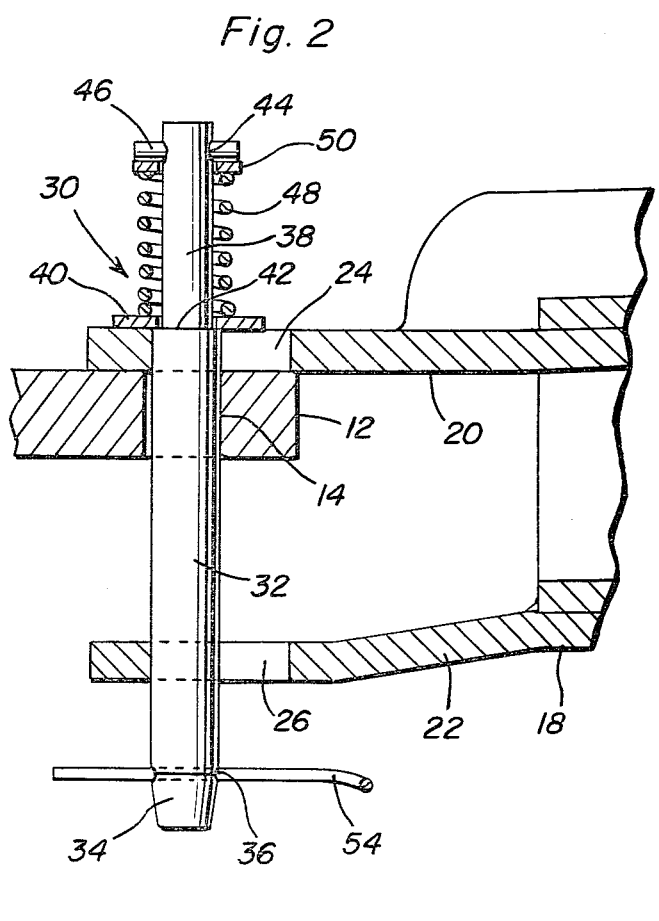
FIG. 2 is an enlarged fragmentary longitudinal vertical section view taken substantially upon the plane indicated by the section line 2—2 of FIG. 1.

The use of a high strength spring 48 is made in order to strongly resist forces on the pin member 32 tending to gradually work the pin member 32 downwardly from the position thereof shown in FIG. 2 and to thereby prevent relative angular displacement of the portions 12 and 20 from causing total collapse of the spring 48 and thus stripping of the pin 46 from the pin member 32. A removable pin 54 is received through bore 36 to prevent accidental upward removal of the pin member 32 from the opening 14 and slots 24 and 26.

The foregoing is considered as illustrative only of the principles of the invention. Further, since numerous modifications and changes will readily occur to those skilled in the art, it is not desired to limit the invention to the excact construction and operation shown and described, and accordingly, all suitable modifications and equivalents may be resorted to, falling within the scope of the invention.

What is claimed as new is as follows:

1. In combination with a draft vehicle including a first rearwardly projecting supported tow bar portion defining a first upstanding opening extending therethrough and a towed apparatus including a second forwardly projecting tow bar portion horizontally lapped over and supported from said first tow bar portion and defining a second upstanding opening extending therethrough registered with said first opening, an upstanding hitch pin freely passed through said openings coupling said first and second tow bar portions together, said hitch pin including an upper end portion projecting above said second tow bar portion, abutment means mounted on said upper end portion for vertical shifting relative thereto above a lower positive limit position on said upper end portion and opposing and abutted downwardly against said second tow bar portion, and preloaded force means connected between said abutment means and hitch pin yieldingly biasing said abutment means against upward movement from said lower limit position.

2. The combination of claim 1 wherein said force means includes means operative to gradually increase the biasing action thereof on said abutment means as said abutment means is shifted upwardly along said upper end portion from its lower limit position thereon.

3. The combination of claim 2 wherein said force means includes a partially compressed coil spring loosely disposed about said upper end portion above said abutment means, and an abutment member carried by the upper terminal end of said upper end portion against which the upper end of said compression spring is abutted.

4. The combination of claim 1 wherein said upper end portion comprises a diametrically reduced upper end and said pin defines a circumferential upwardly facing shoulder at the lower end of said diametrically reduced upper end portion, said abutment means being engageable against said shoulder to define the lower limit position of movement of said abutment means on said upper end portion.

5. The combination of claim 4 wherein said abutment means comprises a washer slidably mounted on said upper end portion and having an inside diameter greater than the diameter of said upper end portion and less than the diameter of said pin at the outer periphery of said shoulder.

6. The combination of claim 5 wherein said force means includes means operative to continuously increase the biasing action thereof on said abutment means as said abutment means is shifted upwardly along said upper end portion from its lower limit position thereon.

7. The combination of claim 6 wherein said force means includes a partially compressed coil spring loosely disposed about said upper end portion above said abutment means, and an abutment member carried by the upper terminal end of said upper end portion against which the upper end of said compression spring is abutted.

8. The combination of claim 7 wherein the lower end of said pin includes an abutment removably supported therefrom.

9. The combination of claim 1 wherein said towed apparatus includes a third forwardly projecting tow bar portion spaced vertically below said first tow bar portion and rigid with said second tow bar portion, said third tow bar portion having a third opening formed therein, the lower end of said pin passing freely through said third opening.

10. The combination of claim 9 wherein said second and third openings comprise slots extending longitudinally of said second and third tow bar portions.

* * * * *